(12) United States Patent
Smith et al.

(10) Patent No.: US 7,988,809 B2
(45) Date of Patent: *Aug. 2, 2011

(54) AIRCRAFT FLOOR AND INTERIOR PANELS USING EDGE COATED HONEYCOMB

(75) Inventors: Lance Smith, Pleasanton, CA (US); Yen-Seine Wang, San Ramon, CA (US); Robert Morrison, Phoenix, AZ (US); Clark Smith, Phoenix, AZ (US)

(73) Assignee: Hexcel Corporation, Dublin, CA (US)

( * ) Notice: Subject to any disclaimer, the term of this patent is extended or adjusted under 35 U.S.C. 154(b) by 1084 days.

This patent is subject to a terminal disclaimer.

(21) Appl. No.: 11/471,078

(22) Filed: Jun. 20, 2006

(65) Prior Publication Data

US 2009/0072086 A1 Mar. 19, 2009

Related U.S. Application Data

(63) Continuation-in-part of application No. 11/228,601, filed on Sep. 16, 2005, now Pat. No. 7,581,366, which is a continuation-in-part of application No. 10/932,510, filed on Sep. 1, 2004, now Pat. No. 7,507,461.

(51) Int. Cl.
| | |
|---|---|
| B29C 65/00 | (2006.01) |
| B32B 37/00 | (2006.01) |
| B32B 3/00 | (2006.01) |
| B32B 3/12 | (2006.01) |
| C09J 5/02 | (2006.01) |
| C09J 4/00 | (2006.01) |
| C09J 101/00 | (2006.01) |
| C09J 201/00 | (2006.01) |
| B64C 1/00 | (2006.01) |

(52) U.S. Cl. ............... 156/292; 156/307.3; 156/338; 244/120; 428/73; 428/118

(58) Field of Classification Search .............. 156/65, 156/292, 306.6, 306.9, 307.1, 307.3, 307.4, 156/307.7, 330.9, 331.8, 338; 428/73, 116, 428/117, 118; 244/119, 120, 123.13, 123.6
See application file for complete search history.

(56) References Cited

U.S. PATENT DOCUMENTS

| | | | | |
|---|---|---|---|---|
| 2,951,004 | A | * | 8/1960 | Martin et al. ............... 156/306.9 |
| 3,707,583 | A | * | 12/1972 | McKown ...................... 427/486 |

(Continued)

FOREIGN PATENT DOCUMENTS

EP 0819723 A1 1/1998

(Continued)

OTHER PUBLICATIONS

DuPont Elvamide Product Brochure (cover page and pp. 7-8)—(publication date unknown).

(Continued)

*Primary Examiner* — Philip C Tucker
*Assistant Examiner* — Brian R Slawski
(74) *Attorney, Agent, or Firm* — W. Mark Bielawski; David J. Oldenkamp

(57) ABSTRACT

Aircraft floor and interior panels where core-skin bonding is improved between honeycomb and composite face sheets (skins) by applying a polyamide and/or rubber-containing adhesive to the edge of the honeycomb prior to bonding. Edge coating of the honeycomb allows one to reduce panel weight without reducing the performance parameters that are required for different types of aircraft floor and interior panels.

20 Claims, 4 Drawing Sheets

U.S. PATENT DOCUMENTS

| | | | | |
|---|---|---|---|---|
| 4,056,878 A | * | 11/1977 | Woodley | 29/525.11 |
| 4,249,976 A | * | 2/1981 | Hudson | 156/286 |
| 4,803,108 A | * | 2/1989 | Leuchten et al. | 428/118 |
| 5,087,500 A | * | 2/1992 | Kasper et al. | 428/116 |
| 5,316,604 A | * | 5/1994 | Fell | 156/82 |
| 5,518,796 A | * | 5/1996 | Tsotsis | 428/116 |
| 5,575,882 A | | 11/1996 | Holz et al. | |
| 6,099,683 A | * | 8/2000 | Meier et al. | 156/292 |
| 6,440,257 B1 | | 8/2002 | Zhou et al. | |
| 6,508,910 B2 | | 1/2003 | Zhou et al. | |
| 7,550,190 B2 | * | 6/2009 | Wang et al. | 428/116 |

FOREIGN PATENT DOCUMENTS

| | | |
|---|---|---|
| EP | 0927737 A1 | 7/1999 |
| JP | 63-137015 | 9/1988 |
| WO | WO 02086008 A1 * | 10/2002 |

OTHER PUBLICATIONS

Hexcel Composites, FIBERLAM 2000, Product Data Brochure, pp. 1-4 (May 2003).

Hexcel Composites, FIBERLAM Aircraft Floor Panels Qualified Products Selector Guide (Apr. 2000).

* cited by examiner

AIRCRAFT FLOOR AND INTERIOR PANELS USING EDGE COATED HONEYCOMB This application is a continuation-in-part of application Ser. No. 11/228,601 filed on Sep. 16, 2005 now U.S. Pat. No. 7,581,366, which is a continuation-in-part of application Ser. No. 10/932,510, filed on Sep. 1, 2004, now U.S. Pat. No. 7,507,461.

BACKGROUND OF THE INVENTION

1. Field of the Invention

The present invention relates generally to sandwich panels and other related structural composite materials. Sandwich panels are typically made up of face sheets (also referred to as "skins") that are adhesively bonded to opposite sides of a core material, such as honeycomb, to form the sandwich panel. In particular, the present invention relates to treating honeycomb in order to improve the bond between the honeycomb and face sheets. The invention is particularly applicable to aircraft floor and interior panels, which are composed of composite honeycomb and composite face sheets.

2. Description of Related Art

Sandwich panels are used in a wide variety of applications where high strength and light weight are required. Honeycomb and rigid foam are used as the core in many sandwich panels. Honeycomb is a popular core material because of its high strength to weight ratio and resistance to fatigue failures. A wide variety of products including metals and composite materials have been used to make the honeycomb cores.

The face sheets that are bonded to the side (also referred to as the "edge") of the honeycomb have also been made from a wide variety of materials including metals and composites. An important consideration in the formation of any sandwich panel is the way in which the face sheets are bonded to the honeycomb. Typically, an adhesive is used to bond the face sheets to the core. The adhesive must rigidly attach the facings or skins to the core in order for loads to be transmitted from one facing to the other and to permit the structure to fulfill all the assumptions implied in the acceptance of the commonly used stress calculation methods. If the adhesive fails, the strength of the panel is severely compromised. The adhesive is especially critical in sandwich panels which use honeycomb as the core because of the relatively small surface area over which the edges of the honeycomb contact the face sheets.

One procedure for applying composite face sheets to honeycomb involves forming a prepreg sheet that includes at least one fibrous reinforcement layer and an uncured resin matrix. Prepreg is a term of art used in the composite materials industry to identify mat, fabric, non-woven material, tow or roving which has been pre-impregnated with resin and which is ready for final curing. A film adhesive is typically added to the prepreg-core assembly and it is then bonded to the honeycomb by curing of both the prepreg resin and adhesive resin at elevated temperature. The film adhesive can be applied as a separate ply layer or as an integral part of the prepreg sheet.

Honeycomb sandwich panels are used in many applications where stiffness and structural strength of the panel are primary considerations. Additionally, honeycomb sandwich panels are also widely used in the aerospace industry where the weight of the panel is also of primary importance. As a result, there has been and continues to be a concerted effort to reduce the weight of the honeycomb sandwich panels without sacrificing structural strength. One area which has been investigated to reduce weight is the elimination of separate adhesive layers. This has been accomplished by making the face sheets from composite materials that are self-adhesive. The resins used in such self-adhesive prepregs must meet the dual requirements of providing suitable structural strength while still providing adequate adhesion to the honeycomb. Exemplary self-adhesive face sheets are described in published European Patent Application Nos. EP0927737 A1 and EP0819723 A1 and in U.S. Pat. Nos. 6,440,257 and 6,508,910.

An alternative method of bonding face sheets to honeycomb involves applying an adhesive to the edge of the honeycomb. The adhesive is typically applied by "dipping" the edge of the honeycomb in the adhesive. The adhesives used in this type bonding are typically referred to as "dip" resins or adhesives. The advantage of this method is that the adhesive is located only where the honeycomb contacts the face sheet, rather than being distributed over the entire face sheet. This method is generally used to bond non-adhesive face sheets, such as aluminum and other metallic face sheets, to the honeycomb.

Honeycomb sandwich panels have been used as floor panels in the fuselages of aircraft. Floor panels are used, especially in large commercial aircraft, to separate the passenger compartment from the various electrical, hydraulic and structural components located in the bottom of the fuselage. The floor panels are generally classified depending on their location and intended use. For example, large commercial aircraft typically include four different types of floor panels: 1) aisle panels; 2) under seat panels; 3) galley panels; and 4) high load panels. The physical characteristics of the panels vary depending on the particular loads experienced during use. For example, the aisle and under seat floor panels tend to be lighter and not as strong as galley and high load floor panels.

It is widely known that an important consideration in the design and construction of any aircraft is to keep overall weight at a minimum. Since the amount of floor panels present in a large commercial or military aircraft can be on the order of 1000 to 3000 square feet and more, it is important to make the floor panels as light as possible while still providing the various structural properties that are required for the particular type of floor panel. Even a small change in floor panel density results in a relatively large change in the overall weight of the aircraft. Accordingly, there is a continuing need to provide floor panels that are light in weight and which still meet the various structural requirements for use in aircraft and other aerospace vehicles.

There are also a large number of interior panels in aircraft that are in the form of sandwich panels. These interior panels do not have to be as structurally strong as floor panels. Such interior panels include sandwich panels that are used to form overhead storage compartments and other interior storage structures, interior non-structural bulkheads, sidewalls and other interior walls, ceiling panels and lavatory panels. The interior sandwich panels are typically lighter than floor panels. The panels must be sufficiently strong to meet required design loads for aircraft interior use while at the same time being as light as possible. In addition, interior panels must meet strict flammability standards. Accordingly, there is also a continuing need to provide interior panels that are light in weight and which meet the various requirements for use in aircraft and other aerospace vehicles

SUMMARY OF THE INVENTION

In accordance with the present invention, honeycomb sandwich panels are provided that include at least one face sheet that has an interior surface that is bonded to a honeycomb core and an exterior surface. The face sheet includes at least one fiber layer and a resin matrix. The honeycomb includes walls that define a plurality of honeycomb cells wherein the walls have at least one edge that is bonded to the interior surface of the face sheet. As a feature of the invention, an adhesive that includes polyamide (a common example of which is commonly referred to as "nylon") and/or rubber is used to bond the face sheet to the honeycomb. It was discovered that the use of an adhesive that includes polyamide and/or rubber provides an especially strong bond between the honeycomb and face sheets where the face sheet includes a resin matrix. The use of a polyamide and/or rubber-containing adhesive in accordance with the present invention was found to be particularly useful in increasing the bonding strength between honeycomb and prepreg face sheets.

As a further feature of the present invention, adhesives that include polyamide and/or rubber provide an increase in the bond strength between honeycomb and prepreg face sheets where the resin matrix used for the prepreg includes a thermosetting resin. The use of polyamide adhesives is particularly useful in increasing the bond strength of self-adhesive prepreg face sheets where the prepreg resin matrix includes a rubber and/or thermoplastic toughened thermosetting resin. In some embodiments of the invention, the bond strength provided by the polyamide adhesive is such that, during separation of the face sheet from the core (in drum peel tests), the honeycomb wall is torn apart while the bond between the face sheet and the honeycomb remains intact. In these embodiments, the adhesive bond is stronger than the core so that the sandwich panel undergoes core failure rather than cohesive failure when the face sheet is peeled from the panel.

As an additional feature of the present invention, adhesives that include polyamide are particularly well suited for bonding face sheets to honeycomb that is made from composite materials. During the fabrication process, a honeycomb slice is typically cut from a large block of honeycomb. The slicing of the honeycomb from the block tends to expose fibers and form "ragged" or "fuzzy" edges that tend to be difficult to bond to the face sheet. Accordingly, in order to improve bond strength, the edges of composite honeycomb are generally treated prior to bonding by sanding, machining or other surface treatment to remove the exposed fibers and smooth the honeycomb edge. The polyamide and/or rubber-containing adhesives in accordance with the present invention provide good bond strength when either fuzzy or smooth honeycomb is used. Accordingly, the time consuming step of removing the fuzzy edges from the composite honeycomb may be deleted if desired.

The present invention not only covers sandwich panels as described above that are made using honeycomb which is edge-coated with a polyamide and/or rubber-containing adhesive, but also covers methods for bonding face sheets to honeycomb to form such sandwich panels. The methods involve providing a face sheet that includes an interior surface for bonding to the honeycomb core and an exterior surface wherein the face sheet includes at least one fiber layer and a resin matrix. A honeycomb is provided that includes walls that define a plurality of honeycomb cells wherein the walls have at least one edge for bonding to the interior surface of the face sheet. An adhesive that includes polyamide and/or rubber is applied to the honeycomb edge to provide an edge-coated honeycomb that is then bonded to the face sheet.

The finished sandwich panels made in accordance with the present invention may be used in a wide variety of situations where a lightweight and structurally strong material is needed. However, the invention is especially well suited for use in aerospace applications where a multitude of strict mechanical and chemical requirements must be met while at the same time not exceeding weight limitations. For example, the sandwich panels of the present invention are useful as floor panels in relatively large aircraft where the amount of floor area in the fuselage can range from a few hundred square feet up to 3000 square feet and more. The combination of low weight and structural strength provided by floor panels in accordance with the present invention is particularly desirable when such large amounts of floor panels are used.

The sandwich panels in accordance with the present invention are also useful as interior panels in aircraft and other aerospace vehicles. Such interior panels are typically lighter than floor panels and generally must meet strict flammability requirements. The panel face sheets are typically made using flame resistant phenolic resins or thermoplastics that meet the flammability requirements for aircraft interior structures. It was discovered that the peel strength of interior panels made using such flame resistant materials is increased substantially when the core edge is coated with a polyamide and/or rubber-containing adhesive.

The above-described and many other features and attendant advantages of the present invention will become better understood by reference to the following detailed description when taken in conjunction with the accompanying drawings.

DETAILED DESCRIPTION OF THE INVENTION

It is preferred that the nylon (polyamide) and/or rubber-containing adhesives in accordance with the present invention be used to improve the bonding of composite face sheets (particularly self-adhesive prepregs) to honeycomb cores to form light-weight structural panels for use in aerospace applications where light weight and structural strength are especially important design criteria. However, those of ordinary skill will recognize that the present invention is not limited to aerospace applications, but may also be used in any situation where there is a need for honeycomb sandwich panels that have face sheets, which are made from composite materials.

Figure 1:
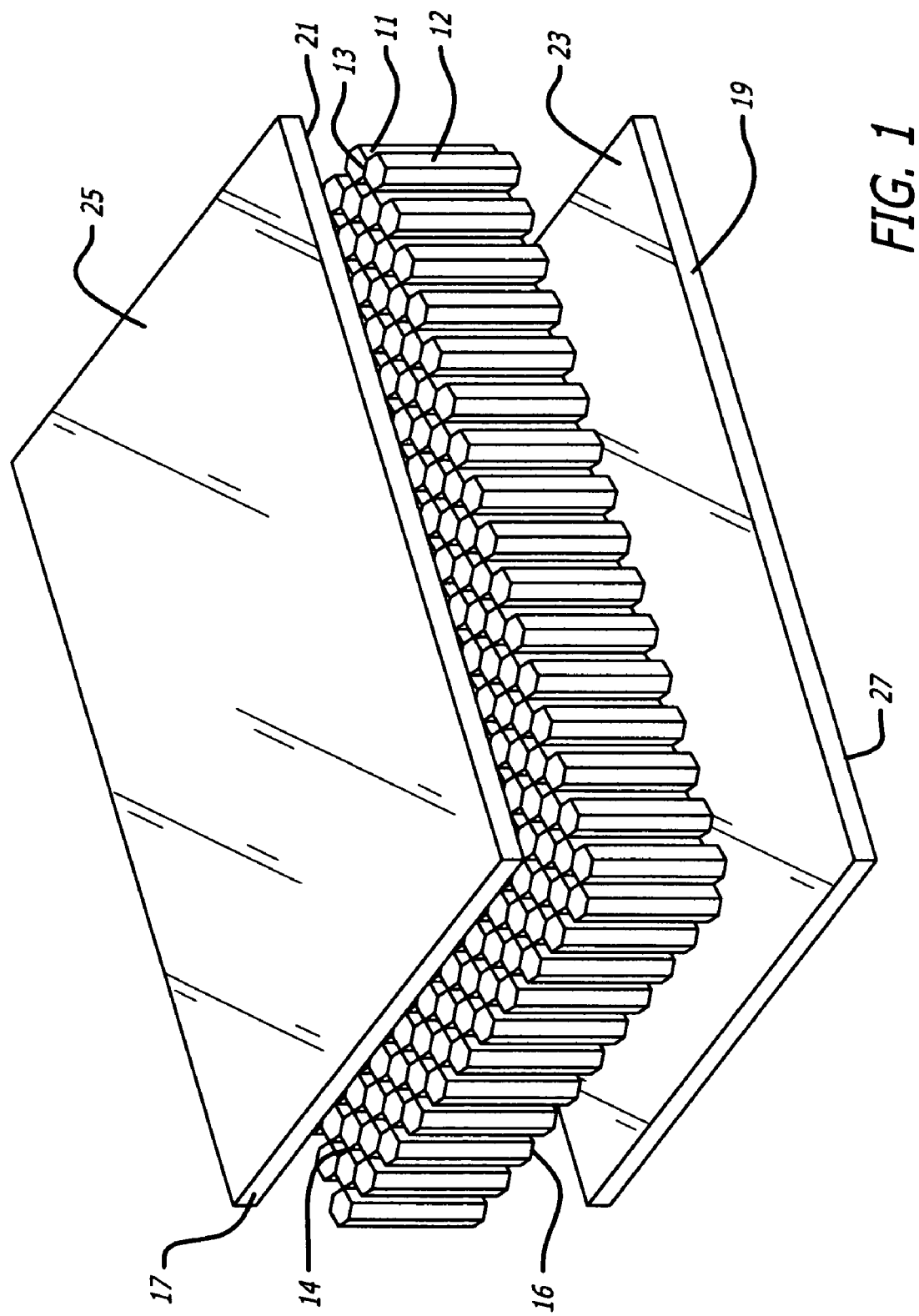
FIG. 1 is a perspective view of a preferred exemplary honeycomb core and two composite face sheets prior to bonding of the honeycomb to the face sheets using an edge-coating adhesive in accordance with the present invention that contains polyamide or a modified polyamide and/or rubber.
Figure 2:
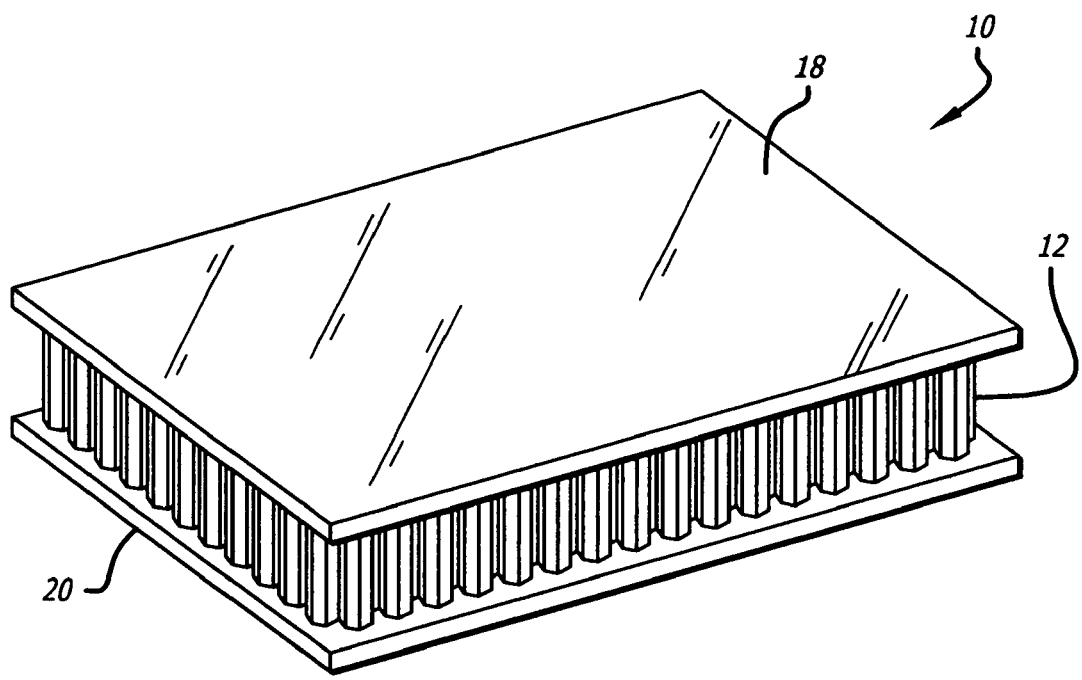
FIG. 2 is a perspective view of a preferred exemplary sandwich panel where the components shown in FIG. 1 have been bonded together and cured to form the final honeycomb sandwich panel.

The three basic components of a preferred exemplary honeycomb sandwich panel for use in aerospace applications are shown in FIG. 1 prior to formation of the panel. The components include a honeycomb core 12 that has walls 11 which form a plurality of honeycomb cells 13. The walls have edges that form the faces or edges of the honeycomb as shown at 14 and 16. The other two components are prepreg face sheets 17 and 19. The face sheets 17 and 19 include interior surfaces 21 and 23, respectively, for bonding to the honeycomb edges. The face sheets 17 and 19 also include exterior surfaces 25 and 27, respectively. In accordance with the present invention, the edges 14 and 16 of honeycomb 12 are coated with an adhesive (not visible in FIG. 1) that includes polyamide and/or rubber as an essential ingredient to form an edge-coated honeycomb. The use of an adhesive that contains polyamide and/or rubber in accordance with the present invention improves the bonding of face sheets 17 and 19 to the honeycomb 12, while adding very little to the weight of the resultant panel. The uncured prepreg face sheets or skins 17 and 19 are applied to the edge-coated honeycomb 12 and then cured to form face sheets 18 and 20 of the finished panel 10 as shown in FIG. 2.

Figure 3:
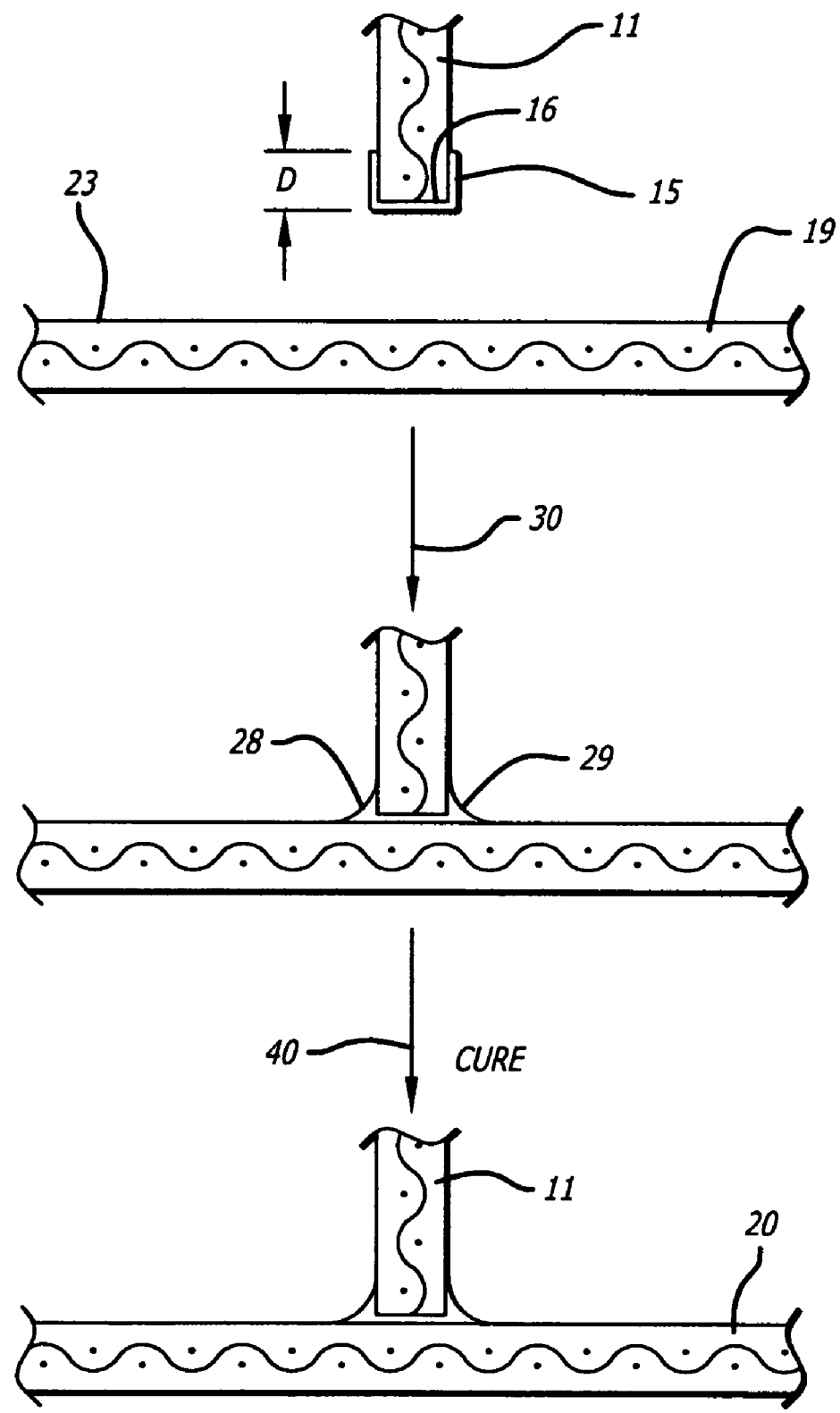
FIG. 3 is a partially diagrammatic representation of an exemplary method in accordance with the present invention showing a single edge-coated honeycomb wall being bonded to a face sheet.

FIG. 3 is a partially diagrammatic representation showing the method for bonding the honeycomb to one of the face sheets 19 in accordance with the present invention. For simplicity, FIG. 3 shows the bonding of a single wall 11 with it being understood that the entire edge 16 of the honeycomb is coated with the polyamide-based adhesive (coating). As shown in FIG. 3, the lower edge of honeycomb wall 11 is coated with a polyamide and/or rubber-containing-based adhesive 15 prior to bonding to the lower uncured prepreg face sheet 19. As represented by arrow 30, the edge-coated honeycomb is located against the face sheet 19 such that the polyamide and/or rubber-containing adhesive flows partially onto the prepreg 19 to form fillets 28 and 29. Then, as represented by arrow 40, the prepreg is cured to form the final sandwich panel 10 that includes the cured face sheet 20.

The honeycomb core 12 can be made from any of the materials which are used to form honeycomb cores. Exemplary honeycomb materials include aluminum, aramid, carbon or glass fiber composite materials, resin impregnated papers, non-woven spun bonded polypropylene, spun bonded nylon, spun bonded polyethyleneterephthlate (PET), and the like. Exemplary preferred honeycomb materials are aramid-based substrates, such as those marketed under the trade name NOMEX® which are available from E.I. DuPont de Nemours & Company (Wilmington, Del.). Honeycomb cores made from NOMEX® are available commercially from Hexcel Corporation (Dublin, Calif.). Preferred exemplary NOMEX® honeycombs include HexWeb® HRH-10 which is available from Hexcel Corporation. Another preferred honeycomb material is resin impregnated aramid fibers, such as KEVLAR® fibers impregnated with phenolic resin. Preferred exemplary KEVLAR® honeycomb is available from Hexcel Corporation under the trade name Hexweb® HRH-36. Honeycomb made from carbon or glass composites are also preferred and typically include carbon or glass fabric and a phenolic and/or polyimide matrix. The honeycomb is typically supplied in a cured form and requires no further treatment prior to bonding to the skins or face sheets other than application of the polyamide and/or rubber-containing adhesive as described below. If desired, the cores may be sanded or otherwise machined to remove the "fuzzy" edges that may be present due to fibers that are exposed during slicing of the honeycomb from the larger block of honeycomb. However, as mentioned previously, the use of polyamide and/or rubber-containing adhesives in accordance with the present invention as an edge coating eliminates or at least substantially reduces the need for removing the fibers that are exposed on the honeycomb edges during fabrication.

The dimensions of the honeycomb can be varied widely. For aerospace use, the honeycomb cores will typically have ⅛ to ½ inch (3.2-12.7 mm) cells (i.e., in diameter/cross-section) with the cores being ¼ inch (6.4 mm) to 2 inches (50.8 mm) thick (distance between the honeycomb edges). The thickness of the honeycomb walls may also be varied with typical honeycomb walls being on the order of 0.001 inch (0.25 mm) to 0.005 inch (0.13 mm) thick. The combination of cell size, wall thickness and density of the material that is used determines the weight of the core, which is expressed in pounds per cubic foot (pcf). Composite honeycomb having weights on the order of 1.5 pcf to 5.0 pcf are preferred for aircraft interior panels. For aircraft floor panels, honeycomb weight on the order of 5.0 pcf to 15.0 pcf are preferred.

The face sheets that are bonded to the honeycomb can be made from any of the materials that are used in composite sandwich panel construction. Such composite materials usually include one or more layers of fibers and a resin matrix. The fibers that are used in the prepreg face sheets 17 and 19 can be any of the fiber materials that are used to form composite laminates. Exemplary fiber materials include glass, aramid, carbon, ceramic and hybrids thereof. The fibers may be woven, unidirectional or in the form of random fiber mat. Woven carbon fibers are preferred, such as plain, harness satin, twill and basket weave styles that have areal weights from 80-600 gsm, but more preferably from 250-400 gsm. The carbon fibers can have from 3,000-40,000 filaments per tow, but more preferably 3,000-12,000 filaments per tow. All of which are commercially available. Similar styles of glass fabric may also be used with the most common being 7781 at 303 gsm and 120 at 107 gsm. When unidirectional constructions are used, typical ply-weights are 150 gsm for carbon and 250 gsm for glass.

Although the composite material may be pre-cured prior to bonding to the honeycomb, it is preferred that resin matrix be in an uncured or partially cured state prior to bonding. The use of uncured face sheets is preferred because it combines curing and bonding of the face sheet to the honeycomb into a single step and allows the polyamide and/or rubber containing adhesive present on the honeycomb to interact with the uncured resin matrix during the bonding process. Prepreg is a preferred form or type of uncured face sheet.

The resin matrix for the prepreg should include a thermosetting resin such as epoxy, cyanate ester, phenolic, benzoxazines, polyimide or bismaleimide. Prepregs that have some inherent adhesiveness (self-adhesive prepreg) are particularly preferred. Prepregs of the type described in issued U.S. Pat. Nos. 6,440,257 and 6,508,910 are examples of self-adhesive prepregs that are capable of bonding to honeycomb to form a suitable sandwich panels without the use of an adhesive layer. These prepregs include a resin matrix that is a combination of thermosetting and thermoplastic resins. Use of nylon and/or rubber-containing adhesives to coat the honeycomb edges was found to provide an unexpected increase in bond strength between the honeycomb and these types of self-adhesive face sheets. Other exemplary face sheets having adhesive properties are available from J.D. Lincoln Inc. (Costa Mesa, Calif.) under the tradename L-591. L-591 is a modified phenolic prepreg that contains 39 percent by weight phenolic resin in combination with 7781-style fiberglass. CYCOM® 2290 available from Cytec Corporation (Anaheim, Calif.) is another phenolic-based prepreg that is suitable for use as a face sheet. Face sheet that are made using phenolic resins are preferred for use in aircraft interior panels.

The preferred resins that are used to form the resin matrix for sandwich panels, other than aircraft interior panels, include epoxy and/or cyanate ester and/or bismalemide resins and one or more curing agents. The resin matrix also preferably includes viscosity control agents and thermoplastic fillet forming particles as described in U.S. Pat. Nos. 6,440,257 and 6,508,910. When viscosity control agents and fillet forming particles are included in the resin matrix, the resin(s) are first mixed with viscosity control agents to form a resin mixture. If necessary, the mixture is heated to ensure that viscosity control agents are completely dissolved. Curing agents and fillet forming particles are then added to the resin mixture. This final resin mixture is kept below the temperature at which the fillet forming particles dissolve in the resin. As a result, the fillet forming particles, which at this stage are preferably uniformly mixed throughout the resin, are not dissolved to a substantial degree and therefore do not increase the resin viscosity to an unacceptable level. The viscosity of the resin mixture is important because it must be such that the resin can be impregnated into the fiber to form the prepreg. For the purposes of this specification, particles which retain at least 90 weight percent of their original particle weight are considered to be not dissolved to a substantial degree. Particles are considered to be substantially dissolved when less than 10 percent by weight of the original particle remains intact within the resin.

The viscosity of the final resin mixture that is used to make the prepreg, including fillet-forming particles, should be between 150 and 1500 poise. The preferred viscosity is between 300 to 1200 poise. The preceding viscosity ranges represent minimum viscosities for the final resin mixture prior to making prepreg when said viscosity is measured by Rheometric Dynamic Analysis (Rheometrics RDA2) at settings of 2° C./min, 10 rads/sec and 0.8-1.0 mm gap. The viscosity of the resin mixture gradually increases when the fillet forming particles dissolve during the curing/bonding process.

During fabrication of the prepreg, the fillet forming particles tend to be concentrated toward the surface of the prepreg due to inherent filtering of the particles by the fiber layer. Alternatively, the fillet forming particles may be applied (e.g., by powder deposition) to the surface of the resin after it has been formed into a prepreg film or after the resin has been impregnated into the fiber layer. In this way, the fillet forming particles are distributed substantially on the surface of the prepreg. In either case, the resin temperature is maintained at a sufficiently low level to prevent the fillet forming particles from dissolving until the prepreg is applied to the core material and cured.

After application to the edge-coated core, the prepreg is heated to a sufficient level for a sufficient time to substantially dissolve the fillet forming particles, cure the prepreg and cure the polyamide-based adhesive. The dissolved thermoplastic particles enhance the toughness of the bond and interact with the polyamide adhesive (as well as the thermosetting resin present in the prepreg matrix resin) to even further strengthen the bond.

Exemplary thermosetting resins which may be used to make the prepreg matrix resin include phenolics, benzoxazines, polyimides, epoxy, cyanate ester and bismaleimide resins. Exemplary epoxy and cyanate ester resins include glycidylamine type epoxy resins, such as triglycidyl-p-aminophenol, tetraglycidyldiaminodiphenyl-methane; glycidyl ether type epoxy resins, such as bisphenol A type epoxy resins, bisphenol F type epoxy resins, bisphenol S type epoxy resins, phenol novolac type epoxy resins, cresol novolac type epoxy resins (e.g. ECN 1299 available from Huntsman Advanced Materials, Inc., The Woodlands, Tex.) and resorcinol type epoxy resins; cyanate esters, such as 1,1'-bis(4-cyanatophenyl)ethane (AroCy L-10, available from Huntsman Advanced Materials, Inc., The Woodlands, Tex.), 1,3-Bis(4-cyanateophenyl-1-1-(1-methylethylidene) benzene (RTX366, available from Huntsman Advanced Materials, Inc., The Woodlands, Tex.). Epoxy resins are preferred for sandwich panels other than aircraft interior panels. Especially preferred epoxy blends include a mixture of trifunctional epoxy and a difunctional bis-F epoxy.

Curing agents and viscosity control agents (optional) are also added to the thermosetting resin to form the basic prepreg matrix resin. The curing agent is preferably an amine curing agent and the viscosity control agent is preferably a thermoplastic material that dissolves in the thermosetting resin.

Although a wide variety of matrix resins may be used in the composite face sheets, matrix resins based on epoxy and cyanate ester formulations are preferred for aircraft floor panels and other applications where a flame resistant resin, such as a phenolic, is not required. In addition, sandwich panels that have two prepreg plies on each face of the honeycomb are preferred. The two layers are preferably either two (0/90) plies or two (±45, 0/90) plies with warp direction aligned with the lengthwise direction of the honeycomb. Those of ordinary skill in the art will recognize that the present invention is also applicable to multiple ply face sheets that include two or more fiber layers.

Exemplary preferred face sheet matrix resin formulations are as follows:

1) 1 to 70 parts by weight of an epoxy;
   5 to 40 parts by weight of an amine curing agent;
   1 to 30 parts by weight of a viscosity control agent; and
   5 to 50 parts by weight of thermoplastic fillet forming particles.

2) 10 to 40 parts by weight of a trifunctional epoxy resin;
   10 to 40 parts by weight of a difunctional epoxy resin;
   11 to 25 parts by weight of an aromatic curing agent;
   0 to 3 parts by weight of a non-aromatic curing agent;
   5 to 15 parts by weight of a viscosity control agent; and
   8 to 30 parts by weight of thermoplastic fillet forming particles.

The epoxy may be composed of trifunctional epoxy, difunctional epoxy and a wide variety of combinations of trifunctional and difunctional epoxies. Tetrafunctional epoxies may also be used. Exemplary trifunctional epoxy include triglycidyl p-aminophenol and N,N-Diglycidyl-4-glycidyloxyaniline (MY-0510 or MY-0500 available from Huntsman Advanced Materials, Inc., The Woodlands, Tex.). Exemplary difunctional epoxies which may be used in the resin include Bis-F epoxies, such as GY-281, LY-9703 and GY-285 which are available from Huntsman Advanced Materials, Inc., Woodlands, Tex.). Bis-A epoxies, such as GY-6010 (Huntsman Advanced Materials, Inc., The Woodlands, Tex.) and DER 331 (Dow Chemical, Midland, Mich.) are suitable Bisphenol-A type epoxies and may also be used. An exemplary tetrafunctional epoxy is tetraglycidyl diaminodiphenyl methane (MY-721, MY-720 and MY-9512 available from Huntsman Advanced Materials, Inc., The Woodlands, Tex.). Other suitable epoxies include phenol novolak type epoxy, cresol novolak epoxy and resorcinol type epoxy. Preferred bis-F epoxies include GY281 and GY285 which are available from Huntsman Advanced Materials, Inc., The Woodlands, Tex.

Exemplary curative agents include dicyandiamide, 3,3-diaminodiphenylsulfone (3,3-DDS), amino or glycidyl-silanes such as 3-amino propyltriethoxysilane, CuAcAc/Nonylphenol (1/0.1), 4,4'-diaminodiphenylsulfone (4,4'-DDS), 4,4'-methylenebis(2-isopropyl-6-methylaniline), e.g., Lonzacure M-MIPA (Lonza Corporation, Fair Lawn, N.J.), 4,4'-methylenebis(2,6-diisopropylaniline), e.g., Lonzacure M-DIPA (Lonza Corp., Fair Lawn, N.J.). Dicyandiamide and 3,3-DDS are preferred curative agents. Especially preferred are combinations of 3,3-DDS and dicyandiamide.

Exemplary viscosity control agents include thermoplastic polyetherimides such as ULTEM® 1000P which is available from General Electric (Pittsfield, Mass.); micronized polyethersulfone such as 5003P, which is available from Sumitomo Chemical Co., Ltd. (Osaka, Japan); HRI-1, which is available from Hexcel Corp. (Dublin, Calif.); and polyimide MATRIMID® 9725, which is available from Huntsman Advanced Materials, Inc. (The Woodlands, Tex.). ULTEM® 1000P and micronized PES are preferred. Micronized PES is especially preferred. The amount and type of viscosity control agent which is added to the epoxy resin mixture may be varied provided that the minimum viscosity of the final resin mixture is maintained between 150 and 1500 poise when said viscosity is measured by Rheometric Dynamic Analysis (Rheometrics RDA2) at settings of 2° C./mni, 10 rads/sec and 0.8-1.0 mm gap. As previously mentioned, mixtures with minimum viscosities of between 300 to 1200 poise are preferred. The viscosity of the prepreg resin prior to addition of the fillet forming particles should be between about 50 poise and 2000 poise at room temperature. The preferred viscosity range is 100 poise to 1500 poise at room temperature.

Densified polyethersulfone (PES) and densified polyetherimide particles may be used as suitable fillet forming particles. Densified PES particles are preferred. The densified polyethersulfone (PES) particles are preferably made in accordance with the teachings of U.S. Pat. No. 4,945,154, the contents of which is hereby incorporated by reference. The average particle size of the PES particles range from 1 to 150 microns. Average particle sizes of 1 to 50 microns are preferred and average particle sizes of 10 to 25 microns are particularly preferred. The microspheres are generally spherical in shape and are classified by passing the densified microsphere powder through a micron sieve. It is preferred that the glass transition temperature (Tg) for the particles be above 200° C.

The PES which is used may be "micronized", if desired. Micronized PES refers to PES particles that have a rough surface configuration that is produced by grinding the particles or using other abrasive techniques of manufacture that are known in the art. Micronized PES particles may also be made by using spraying and drying procedures that are also known in the art. Micronized PES particles are preferably less than 120 microns in size. Especially preferred are particles under 50 microns in size with a range of 10 to 25 microns being particularly preferred.

The prepreg resin is made by first mixing the epoxy components together and then slowly adding the polyetherimide or micronized PES viscosity control agents. The resulting mixture is heated to around 130° C. and mixed for a sufficient time to dissolve the polyetherimide/PES particles. Once the polyetherimide/PES is dissolved, the mixture is cooled to around 75° C. The aromatic amine curing agent and the fillet forming densified PES particles are then added to the mixture. The resin should be kept at temperatures below about 70° C.-75° C. while the curative agent and densified PES particles are being mixed into the resin. The final resin has a minimum viscosity of between 150 to 1500 poise when said viscosity is measured by Rheometric Dynamic Analysis (Rheometrics RDA2) at settings of 2° C./min, 10 rads/sec and 0.8-1.0 mm gap. The preferred viscosity range is 300 to 1200 poise.

The finished resin is applied to the desired fabric to form the prepreg. The resin content of the prepreg may be varied depending upon a number of different parameters in order to achieve desired mechanical and structural properties for the sandwich panel. It is preferred that the prepreg have a resin content of 35-45 weight percent.

The prepreg is bonded to the edge-coated honeycomb core using vacuum and/or pressure and heated to cure the prepreg and polyamide and/or rubber-containing adhesive to form cured face sheets that are securely bonded to the honeycomb. The amount of vacuum, pressure and heat required to cure and bond the prepreg to the edge-coated honeycomb may be varied depending upon the particular matrix resin formulation, the particular polyamide and/or rubber-containing adhesive formulation, the amount of resin matrix in the prepreg and the amount of adhesive on the honeycomb edge. In general, sufficient pressure must be applied to the prepreg to ensure that good contact is made between the honeycomb and prepreg face sheet to provide adequate bonding. When fillet-forming particles are present in the matrix resin, the temperature and other curing conditions are also selected such that the densified PES particles are substantially dissolved during the curing/bonding process.

In accordance with the present invention, a polyamide and/or rubber-containing adhesive is applied to the edges of the honeycomb prior to bonding with the composite face sheet. In one embodiment, the adhesive includes polyamide (nylon) as a major ingredient. These types of adhesives are referred to herein as "nylon adhesives" or "polyamide adhesives" and include any of the known adhesive compounds that include nylon as a major component (at least 40 weight percent and preferably at least 60 weight percent). Polyamide adhesives are available commercially and typically include polyamide in amounts ranging from 60 to 100 weight percent. Within a polyamide adhesive, other components such as epoxies may also be blended, for example, in a concentration of 40-60 weight percent of the total polyamide adhesive. Exemplary polyamide types that may be used include nylon 66, nylon 612, nylon 6. Exemplary polyamide types that may be used include nylon 66, nylon 612, nylon 6. Preferred polyamide adhesives contain transparent thermoplastic polyamides that have glass transition temperatures of from about 110° C. to 180° C. However, polyamide adhesives having glass transition temperatures in the range of 30° C. to 180° C. may be used, if desired. Polyamide adhesives that contain only aliphatic blocks, such as ELVAMIDE, have glass transition temperatures that are at the lower end of the acceptable range (i.e. 30° C. to 60° C.). Polyamide adhesives that additionally contain cycloaliphatic blocks and aromatic blocks, such as GRILAMID, have glass transition temperatures that are at the higher end of the acceptable range (i.e. 100° C. to 160° C.). Only those polyamide adhesives that contain aromatic blocks, such as GRILAMID TR55, have glass transition temperatures above about 160° C. Polyamide adhesives that contain aromatic blocks are particularly preferred for use in high temperature and high humidity environments. The Tg of the polyamide can be higher than 160° C. if the percentage of aromatic blocks in TR55 is increased.

Polyamide adhesives are available commercially from E.I. DuPont de Nemours & Company (Wilmington, Del.) under the trade names NYSOL (previously ZYTEL) and ELVAMIDE. NYSOL and ELVAMIDE are preferred polyamide (nylon) adhesives for use as edge coatings. Other exemplary commercially available polyamide adhesives are ORGASOL, which is available from Atofma Chemicals, Inc. (Philadelphia, Pa.) and GRILAMID TR55 which is available from EMS Chemie (Sumter, S.C.). Exemplary preferred polyamide adhesives include ELVAMIDE 8061, 8066 and 8023R; and NYSOL 1020.

The commercially available polyamide adhesives described above are typically supplied as a solid. The solid polyamide adhesive is dissolved in a suitable solvent, such as a blend of water and alcohol, to form a solution that is applied to the honeycomb edge. The solvent is evaporated to leave a polyamide coating on the honeycomb edge. Ethanol, benzyl alcohol and combinations of ethanol and benzyl alcohol are preferred solvents. The amount of solvent that is used to dissolve the polyamide can be varied to provide a solution having the desired viscosity for application to the honeycomb edge. In general, the solutions of polyamide adhesive will include from 10 to 50 weight percent polyamide.

ELVAMIDE 8061, 8066 and 8023R are exemplary adhesives. The ELVAMIDE adhesives are semi-transparent and contain only aliphatic blocks. The melting points (ASTM D3418) of ELVAMIDE 8061, 8066 and 8023R are 156° C., 115° C. and 154° C., respectively. The relative viscosities are 70-100 for ELVALMIDE 8061, 21-29 for ELVAMIDE 8066 AND 24-36 for ELVAMIDE 8023R. The Shore Hardness (ASTMD2240) is 75 for ELVAMIDE 8061, 72 for ELVAMIDE 8066 and 70 for ELVAMIDE 8023R. The tensile strength (ASTM D638) is 7,500 psi for ELVAMIDE 8061, 5,700 for ELVAMIDE 8066 and 7,400 psi for ELVAMIDE 8023R. The elongation at break (ASTM D638) at 23° C. is 320% for ELVAMIDE 8061, 370% for ELVAMIDE 8066 and 370% for ELVAMIDE 8023R.

GRILAMID TR55 and TR90 are transparent thermoplastic polyamides based on aliphatic, cycloaliphatic and aromatic blocks. TR90 contains aliphatic and cycloaliphatic blocks. TR55 contains aliphatic, cycloaliphatic and aromatic blocks. The glass transition temperature (ISO 11357) for TR55 is 160° C. and 155° C. for TR90. The tensile E-modulus (ISO 527) for TR55 is 2200 MPa and 1600 Mpa. The tensile strength at yield (ISO 527) for TR55 is 9 MPa and 60 MPa for TR90. The elongation at yield (ISO 527) is 9% for TR55 and 6% for TR90. The tensile strength at break (ISO 527) is 50 MPa for TR55 and 45 MPa for TR90. The elongation at break (ISO 527) is greater than 50% for TR55 and greater than 50% for TR90. The ball indentation hardness (ISO 2039-1) for TR55 is 120 MPa and 90 MPa for TR90. The dielectric strength (IEC 60243-1) is 31 kV/mm for TR55 and 34 kV/mm for TR90. The comparative tracking index (IEC 60112) for TR55 is 600 and 600 for TR90. The heat deflection temperature (ISO 75) at 1.80 MPa is 130° C. for TR55 and 115° C. The heat deflection temperature at 0.45 MPa is 145° C. for TR55 and 135° C. for TR90. GRILAMID TR55 is a particularly preferred polyamide adhesive for use in accordance with the present invention.

The final honeycomb sandwich panel may be designed for use in high temperature (above 160° F./71 C and above) and/or high humidity (>80 percent relative humidity and above) environments. In these situations, it is preferred that polyamide be combined with one or more thermosetting resins to form polyamide adhesives that function well in such high temperature and/or high humidity conditions. Epoxy, cyanate ester, bismalemide and phenolic resins are exemplary of the types of thermosetting resins that may be combined with polyamide to form high temperature/high humidity polyamide adhesives in accordance with the present invention. Epoxy and phenolic resins are preferred. The resins may be used alone or in combination. Exemplary epoxies have been described above. Exemplary phenolics include any of the commercially available phenolics, such as 23-983 Resin which is available from Durez Corp. (Addison, Tex.), and 23056, available from Durez Corp. (Addison, Tex.). Preferred high temperature/high humidity polyamide adhesives include polyamide in amounts ranging from 40 to 90 weight percent polyamide and one or more thermosetting resins in amounts ranging from 10 to 6 weight percent. Suitable curing agents for the resins need to be included as is well know in the art. Coupling agents and other conventional additives may be included as is also well known in the art. In addition, solvents for the thermosetting resins, such as toluene and xylene, may be used to form resin solutions that are combined with solutions of polyamide (as described above) to form the high temperature/high humidity polyamide adhesive solution. The amount of thermosetting resins in such solutions will typically range from 10 to 80 percent by weight.

Rubber in liquid or particulate form may be added to the polyamide adhesive. Polybutadiene rubbers are preferred with acrylonitrile-butadiene copolymer (NBR or Buna-N) being particularly preferred. Any rubber may be used in combination with polyamide to form the edge coating adhesive provided that it does not adversely affect the viscosity and adhesive properties of the adhesive. In addition to acrylonitrile-butadiene copolymer rubber, other exemplary rubbers include butadiene homopolymer rubber, styrene-butadiene (SBR or Buna-S) rubber, natural (gum) rubber, ethylene-propylene (EPR) rubber, carboxylated nitrile rubber and hydrogenated nitrile rubber. The amount of rubber that is added may be varied depending upon the particular polyamide adhesive being used. Amounts of rubber on the order of 5 to 20 weight percent of the total adhesive are preferred. It is also preferred that the rubber that is incorporated into the polyamide adhesive is a liquid in order to prevent the viscosity of the polyamide adhesive from being too high. Solid rubber may also be used. However, it is preferred that the solid rubber particles be pre-dissolved in a solvent, such as MEK, and then mixed into the polyamide solution. The addition of rubber improves the room temperature toughness of the adhesive and reduces the adhesive performance at elevated temperatures. Accordingly, the amount of rubber that is added is selected to provide the desired degree of increase in room temperature toughness without reducing the high temperature performance of the adhesive below desired levels.

In another embodiment of the present invention, rubber forms an essential ingredient of the adhesive with the inclusion of polyamide being optional. The rubber-based adhesive preferably contains a thermosetting resin in combination with rubber. Such rubber-modified thermosetting resins typically contain a thermosetting resin as the principal ingredient with rubber being present in amounts that range from 5 weight percent to 50 weight percent of the total adhesive. Any of the thermosetting resins mentioned above in connection with the polyamide-thermosetting adhesive may be used. Such resins include epoxies, cyanate esters, bismaleimides and phenolics. Epoxies are preferred. However, it is also preferred that the type of thermosetting resin used in the rubber-modified adhesive be the same or similar to the thermosetting resin that is used as the resin matrix in the face sheet prepreg. For rubber-modified epoxy resins, the amount of rubber is preferably between about 5 weight percent and 25 weight percent. Particularly preferred rubber amounts are on the order of 15 to 20 weight percent.

Any of the various types of rubbers mentioned above can be combined with one or more thermosetting resins to provide an edge-coating adhesive in accordance with the present invention. Acrylonitrile-butadiene rubber (NBR) is a preferred rubber. NBR, as well as the other types of rubbers listed above are available commercially from a number of sources. Examples include HYCAR CTBN which is available from Noveon Specialty Chemicals (Cleveland, Ohio) and NIPOL NBR which is available from Zeon Chemicals (Louisville, Ky.). NIPOL 1472, HYCAR 1300x13 and combinations thereof are particularly preferred. HYCAR 1300x13 is a liquid rubber that has an acrylonitrile content of 26 percent. With respect to the carboxyl content, the Acid Number is 32 and the Equivalents per Hundred Rubber is 0.057. The Brookfield Viscosity at 27° C. is 500,000 mPas. The glass tansition temperature (measured via Differential Scanning Calorimeter) is −39° C. and the functionality of the rubber is 1.8. The molecular weight is 3150 Mn.

The rubber should have a molecular weight of between 2500 Mn and 60000 Mn. The molecular weight(s) of the rubber are chosen to provide an adhesive that has a sufficiently high rubber content (at least 5 weight percent and preferably 15-20 weight percent) while still having a viscosity that is low enough to allow it to be applied as an edge coating in accordance with the present invention. The viscosity of the rubber solutions and adhesive can be adjusted using solvent to achieve desired viscosity levels. The amount of rubber, solvent and other ingredients are selected to preferably provide a rubber-modified adhesive that has a viscosity of between about 1000 and 150000 poise at 21° C.

The rubber-modified thermosetting resin may include any number of additives that are typically included in such resin systems. Exemplary additives include polyamide in amounts that are compatible with the rubber in the adhesive. Any of the polyamides described in connection with the polyamide adhesive may be used. Other exemplary additives include: flame retardants, such as tetrabromo bisphenol A; colorants, such as antimony trioxide; and anti-foam agents, which may be added in typical amounts for such additives.

The rubber-modified thermosetting resin should include a suitable curing agent, which may or may not be included as part of the thermosetting resin when it is mixed with the rubber component(s). Any of the various curing systems and agents may be used as described previously in connection with the curing of thermosetting resins used in the face sheet prepregs. Tertiary amine catalysts, urea catalysts and combinations thereof are preferred. Dicyandiamide and/or DDS are preferred curing agents.

Rubber-modified thermosetting resins are available commercially from a number of sources. However, these commercial resins typically do not contain sufficient amounts of rubber to be suitable for use as an edge coating adhesive in accordance with the present invention. It is preferred that the rubber-modified thermosetting resin adhesive be made by combining the thermosetting resin(s) with rubber in a multi-stage process. Solid rubber particles (e.g. NIPOL 1472) having a relatively high molecular weight (typically 54000 Mn) are first mixed with a suitable solvent, such as methylethyl ketone (MEK) to form a rubber solution in which the particles are completely dissolved. This rubber solution is then added to a second solution that contains a mixture of lower molecular weight rubber (e.g. HYCAR 1300x13) and the thermosetting resin. Catalysts and other additives may be included in the second solution. The resulting mixture is heated to temperatures on the order of 120° C. to 150° C. for a sufficient time (typically 60-120 minutes) to build up molecular weight and form a uniform solution. If desired, additional resin, rubber, additives and/or catalysts and the like can be added to the two solutions after they have been mixed together and heated (i.e. pre-cooked). This type of staged addition of rubber, where solid rubber particles are first dissolved in a solvent and then added to a liquid rubber/thermosetting resin mixture, is preferred in order to achieve relatively high rubber loading of the adhesive while keeping the viscosity low enough to provide adequate coating of the honeycomb edge and improved face sheet bonding.

The polyamide and/or rubber-containing adhesive may be applied to the honeycomb edge using any technique that provides a uniform edge coating. The preferred method is to dip or press the honeycomb edge into a layer of (adhesive solution). The adhesive layer is preferably formed by pouring the polyamide and/or rubber-containing adhesive solution onto a flat surface and spreading the adhesive out using a Gardner's knife of other suitable blade. The objective is to form a uniformly thick layer that is from 0.001 inch (0.0254 mm) to 0.050 inch (1.3 mm) thick. The preferred range of thickness for the adhesive layer is from 0.003 inch (0.08 mm) to 0.008 inch (0.20 mm). The thickness of the layer may be increased or decreased outside this range, if desired, depending upon the thickness of the core, cell size and wall thickness as well as the particular face sheets being bonded to the honeycomb. The thickness of the adhesive solution layer determines the depth (see "D" in FIG. 3) of the coating on the honeycomb edge. The preferred depth of the edge coating for any given honeycomb-face sheet combination may be determined by routine experimentation involving varying the edge coating depth and measuring the resulting bond (peel) strength of the honeycomb-face sheet bond.

The honeycomb edge is coated with adhesive by simply placing the honeycomb edge onto the adhesive layer and moving the honeycomb downward to contact the underlying surface. The honeycomb is then pulled away from the underlying surface with adhesive solution remaining only on the portion of the honeycomb walls that was immersed in the adhesive layer. The solvent, if any, is evaporated to leave a coating of polyamide and/or rubber-containing adhesive on the honeycomb edge. Edge coating of the honeycomb in this manner is well know and preferred since it provides a simple and effective method for applying a uniform coating of adhesive to the edge of the honeycomb. Other methods involving powder coating, spray, roller or brush application of the adhesive may also be used, if desired, especially for edge coating of relative large honeycomb core.

The amount of polyamide and/or rubber-containing adhesive that is applied to the honeycomb edge may be varied provided that the desired degree of bond strength is obtained without adding too much weight to the panel structure. The amount of polyamide adhesive that provides the optimum combination of high bond strength and light weight can also be determined by routine experimentation. This is achieved by not only varying the depth (D) of the edge-coating, but also varying the viscosity or tackiness of the polyamide adhesive solution. Also, after evaporation of the solvent, the core can be dipped again to pick up additional adhesive. This re-dipping process can be repeated as many times as necessary to achieve the desired level of adhesive loading. The drying temperature depends on the solvent used in the polyamide solution. For water-based coatings, the drying time is typically 4 minutes at 121° C. The amount of polyamide adhesive applied to the honeycomb edge is preferably between 0.5 g sq.ft. (5.4 g/sqm) and 10 g/sq. ft. (107.6 g/sqm). However, the amount of adhesive that is used can be varied widely depending upon the intended use for the honeycomb sandwich panel and the desired combination of panel weight and face sheet peel strength.

Figure 4:
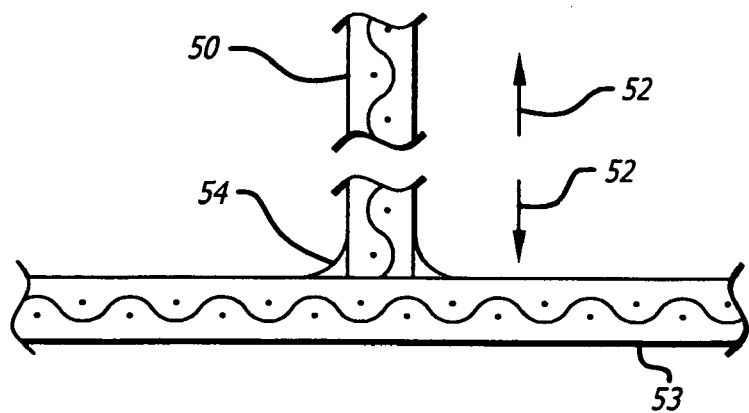
FIG. 4 is a partially diagrammatic view showing an embodiment of the present invention where the sandwich panel undergoes core failure during forcible separation of the face sheet from the honeycomb.

The bond formed by the polyamide and/or rubber-containing adhesive and face sheet resin matrix is preferably as strong or stronger than the structural strength of the honeycomb. For example, it is preferred that the polyamide adhesive, prepreg face sheet and honeycomb are chosen such that (when the face sheet is forcibly pulled from the honeycomb) the body of the honeycomb (shown at 50 in FIG. 4) separates (see arrows 52) from the face sheet 53 prior to failure of the bond 54 between the honeycomb and face sheet bond. The use of a polyamide adhesive edge coating in combination with composite face sheets in accordance with the present invention provides sufficiently high bond strength between the face sheet and honeycomb so that it is routinely possible to make sandwich panels where at least a portion of the core suffers structural failure prior to bond failure during peel tests. The particularly high bond strengths provided by the present invention allows one to obtain maximum structural strength from a panel structure where the overall strength of the panel is limited by the structural strength of the core and not the bond between the face sheet and core.

Figure 5:
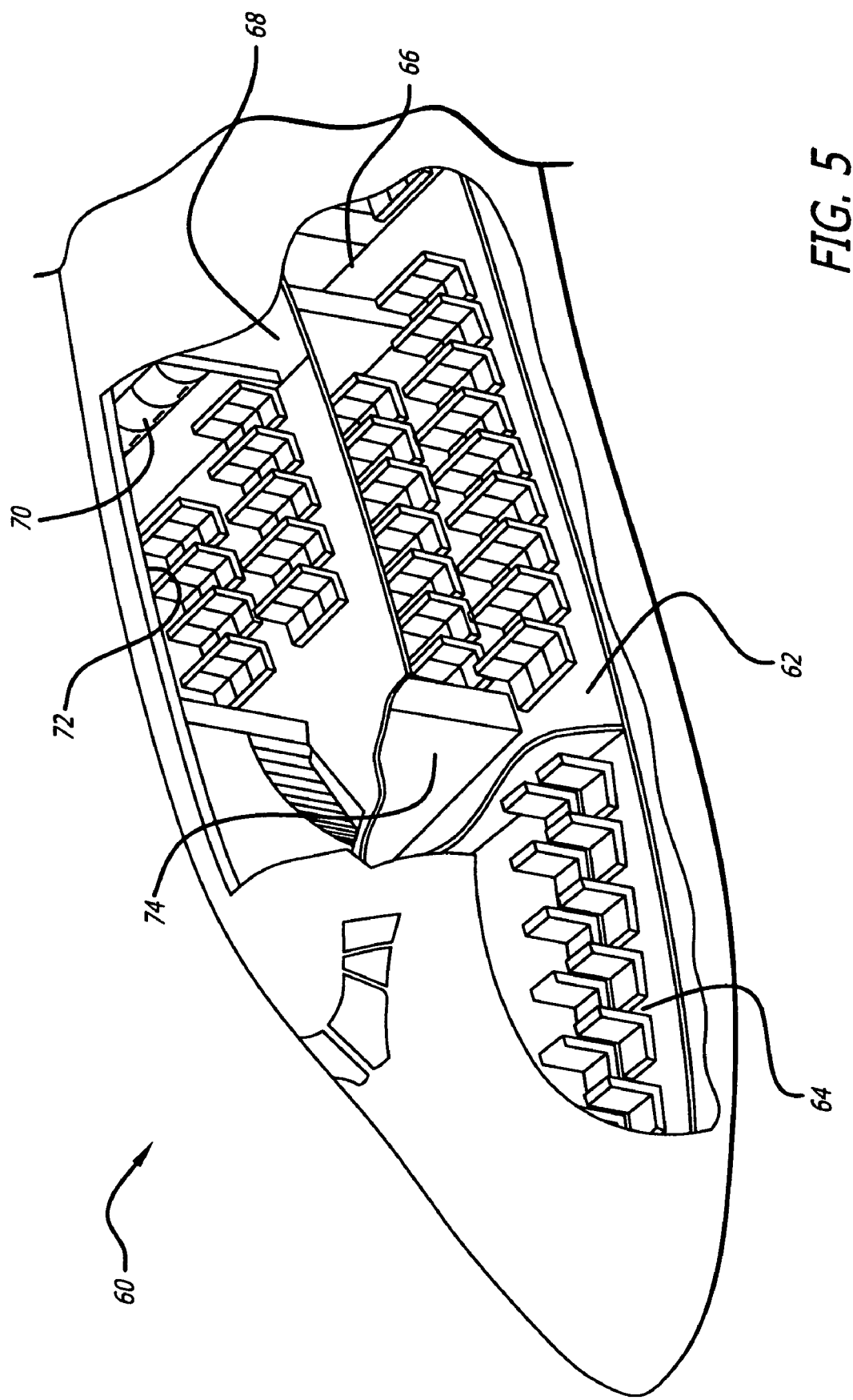
FIG. 5 is a partial sectional view of an aircraft fuselage that shows examples of various types of floor and interior panels, which are typically present in a large aircraft.

The sandwich panels are particularly well suited for use as aircraft floor panels for use in large aircraft, as shown at 60 in FIG. 5. The floor panels present in the aircraft 60 include aisle floor panel 62, under seat floor panel 64; high load floor panel 66; and galley floor panels 68. All of the floor panels are preferably on the order of 0.30 to 0.50 inch thick with 0.40 inch thick panels being particularly preferred. The weight of the floor panels will vary depending upon type and thickness. For panels that are 0.40±0.01 inch thick, it is preferred that the panel weights be equal to or less than: 0.41 lbs/sq. ft. for aisle floor panels; 0.47 lbs/sq. ft. for underseat floor panels; 0.64 lbs/sq. ft. for galley; and 0.90 lbs/sq. ft. for high load floor panels.

The long-beam bending of the panels (MIL-STD-401B, 20-inch span, ¼ point loading) is preferably at least about: 300 lbs for aisle floor panels; 310 lbs for under seat floor panels; and 360 lbs for galley and high load floor panels. The long beam deflection at 100 lbs (L-STD-401B, 20-inch span, ¼ point loading) is preferably no more than about: 0.38 inch for aisle floor panels; 0.035 inch for under seat floor panels; and 0.31 inch for galley and high load floor panels. The panel shear strengths (MIL-STD-401B) are preferably higher than: 500 lbs for aisle floor panels; 800 for under seat floor panels; 1200 for galley and high load floor panels. The drum peel strength (MIL-STD-401B) of the face sheets is preferably at least: 35 in-lbs/3 inch for the aisle floor panels; and 50 in-lbs/3 inch width for the other three types of floor panels.

The floor panels can be made from a variety of cores and face sheets provided that the polyamide dip adhesive is used and the above physical and structural parameters are met. The preferred core material for floor panels are aramid fiber/epoxy resin composites, such as HexWeb®HRH36. The cell size is preferably about ⅛ inch to 3/16 inch. The density of the core (wall thickness) is varied to provide the desired weight and structural limits as set forth above depending upon the type of floor panel. Relatively low density core (3-10 lb/cu. ft.) is used for aisle and under seat floor panels and medium density (8-12 lb/cu. ft.) is used for the galley and high load floor panels.

The face sheets for the floor panels are preferably formed using prepregs composed of woven carbon fiber tows. There preferably are 1200 carbon filaments per tow and the tows are woven to provide a cloth that has an areal weight of about 315 gsm. The resin content of the prepreg may range from 30 to 50 percent by weight. Resin contents of about 38 weight percent are preferred.

Both of the edges of the honeycomb are preferably coated with a polyamide adhesive, such as ELVAMIDE 8066 or GRILAMID TR55, which are composed essentially of nylon. The amount of polyamide adhesive that is applied to each of the honeycomb edges is preferably from 10 gsm to 80 gsm. The floor panels are formed following the same procedures set forth above for forming panels in accordance with the present invention. In fabricating the floor panels, various combinations and amounts of honeycomb, prepreg face sheets and dip resin may be used provided that the final floor panel meets the weight and structural parameters set forth above for the specified panel type.

The sandwich panels are also particularly well suited for use as panels that form non-structural components in the interiors of large aircraft. A few exemplary interior components that can be made using aircraft interior sandwich panels in accordance with the present invention are shown in FIG. 5. They include overhead storage bins 70, ceiling panels 72 and bulkhead panels 74. Other types of panels include lavatory panels, wardrobe panels, galley panels, partition panels, sidewall panels and the like.

Since the interior panels are present in the interior of the aircraft, it is preferred that the resin components are resistant to high temperatures and fire. In addition, when the resins do burn, it is preferred that they produce low amounts of smoke and other noxious fumes. Accordingly, the aircraft interior panels of the present invention preferably have face sheet that are made from composites that have a phenolic resin matrix. Any of the phenolic resin compositions that are know to be high temperature and flame resistant may be used. In addition, the core material is preferably honeycomb made using a resin matrix that is also a high temperature/flame resistant phenolic resin.

The honeycomb should have a density of between 1.5 to 4.0 pcf and the overall interior panels should weigh between 0.2 and 0.4 pounds per square foot (psf). This weight range provides the desired combination of strength and light weight that is needed for a panel to be acceptable for use in the interior of large aircraft. The prepreg face sheet, honeycomb and edge-coating adhesive are chosen such that the interior panel meets the psf weight limitation for the interior panel. Preferred exemplary cores are aramid paper cores impregnated with phenolic resin, such as HexWeb HRH36 honeycomb. Preferred honeycomb have ⅛-inch cells and are from 0.2 to 0.5 inch thick.

It is preferred that each edge of the interior panel honeycomb be coated with from 0.5 to 3.0 gsf or 5 to 30 grams per square meter of edge-coating adhesive. Total edge-adhesive for the panel will therefore range from 1.0 to 6.0 gsf or 10 to 60 gsm. Preferred adhesives are those that contain mainly polyamide. Edge coating adhesives that contain rubber and/or resin, as discussed in detail above, may be used provided that the amount of rubber and/or resin that is present in the panel does not cause the generation of undue amounts of smoke when burned.

Examples of practice are as follows:

Comparative Example 1

A prepreg matrix resin was prepared having the following formulation:

23 weight percent MY-0510 (N,N-Diglycidyl-4-glycidyloxyaniline);

25 weight percent GY281 (bis-F epoxy);

19 weight percent 3,3-Diaminodiphenylsulfone (3,3-DDS);

7 weight percent ULTEM® 1000P (polyetherimide); and 26 weight percent densified PES.

The densified PES was made from PES 5003P which is available from Sumitomo Chemical Co. Ltd. (Osaka, Japan). The PES was densified in accordance with U.S. Pat. No. 4,945,154. MY0510 and GY281 were first mixed in a mixing vessel, heated to 70° C. for approximately 10 minutes. The ULTEM® 100P particles were then added and the resulting mixture heated to 130° C. with mixing for approximately 75 minutes to fully dissolve the ULTEM® 100P particles. The mixture was then cooled to 75° C. and the 3,3-DDS was mixed in for about 15 minutes. Then, the densified PES was slowly added and mixed in for approximately 10 minutes to provide the final resin mixture. The viscosity of the homogeneous resin was measured over the entire curing temperature range (i.e., 20° C. to 177° C.) using Rheometric Dynamic Analysis as previously described. The resin had a minimum viscosity of 900 poise.

Face sheets were prepared by first forming a prepreg of 193 gsm plain weave (PW) fabric woven from 3000 filament (3K) carbon fiber tows impregnated with 138 grams of resin per square meter. The prepreg was formed as follows:

The resin was coated on release paper by reverse roller at about 175° F. (79° C.) to form a film containing 69 g/m². Two resin films were impregnated into the carbon fiber (in the form of the PW woven fabric) with an areal weight of 193 g/m².

The prepreg was applied to HRH® 10 core having ⅛ inch (0.31 cm) cells and being ½ inch (1.27 cm) thick under vacuum at 22 inches (56 cm) Hg and cured for 2 hours at 177° C. with a pressure of 45 psi, venting at 20 psi and ramp cooling at a rate of 2° C. per minute. The resulting specimens were subjected to peel test according to ASTM D 1781. The face sheets all had peel strengths between 29 and 33 in-lb/3 in width.

Comparative Example 2

A prepreg matrix resin was prepared in the same manner as Comparative Example 1 except that the ingredients used to make the resin were as follows:
21 parts by weight MY-0510;
21 parts by weight AcroCy® L-10;
21 parts by weight GY281;
9 parts by weight ULTEM® 1000P;
1.5 parts by weight CuAcAc/Nonylphenol (1/0.1); and
26.5 parts by weight densified PES.

The minimum viscosity of the homogeneous resin mixture was found to be about 500 poise. The viscosity of the final resin mixture was measured as set forth in Example 1. The final resin mixture was used to form a prepreg and applied to HRH® 10 core in the same manner as Example 1. The peel strength of the resulting face sheet was 26 in-lb/3 in width.

Comparative Example 3

A prepreg matrix resin was prepared having the following formulation:
27.0 weight percent MY-0510 (N,N-Diglycidyl-4-glycidyloxyaniline);
24.9 weight percent GY285 (bis-F epoxy);
15.8 weight percent 3,3'-Diaminodiphenylsulfone;
1.3 weight percent Dicyandiamide;
13.5 weight percent micronized Polyethersulfone (PES); and
17.5 weight percent densified Polyethersulfone (PES).

Resin formulations may also be made wherein the amounts of MY-510, GY281 and 3,3-DDS are varied by up to ±15%. Also, the amounts of both types of PES may be varied by as much as ±40%. The amount of dicyandiamide may be varied by up to ±50%.

The densified PES was the same as used in Comparative Examples 1 and 2. Average particle size was 10-25 microns with no more than 13 weight percent smaller than 5 microns and no more than 4 weight percent greater than 40 microns. 24.9 parts by weight of GY285 and 6.0 parts by weight of MY0510 were mixed in a resin kettle and heated, with stirring, to 65° C. Once this temperature is attained, 13.5 parts by weight micronized PES 5003P is added to the resin kettle. The mixture is then heated to 128±2° C. and held at this temperature for 75 minutes. At the end of 75 minutes, heating is removed and 21 parts by weight of MY0510 are added to the kettle. Stirring is continued as the mixture cools to 65° C. 15.8 parts of 3,3-DDS is added and mixed for 15 minutes. 1.3 parts of dicyandiamide is then added and the mixture stirred for 5 minutes at 65° C. Finally, 17.5 parts of densified PES is added and stirred in for 10 minutes. The minimum viscosity of the resin was measured as set forth in Example 1 and found to be about 370 poise. Panels were prepared by first forming a prepreg of 193 gsm 3K PW carbon fabric containing 70 grams of resin per square meter. The prepreg was formed as follows:

The resin was coated on release paper by reverse-roll coater at about 165° F. (74° C.) to form a film containing 70 g/m². The resin film was impregnated into a carbon fiber fabric having an areal weight of 193 g/m². The prepreg was then applied to HRH® 10 core and cured in the same manner as Comparative Example 0.1. The peel strength was around 32 in-lb/3 in width on 3 pound core and around 31 in-lb/3 in width on 8 pound core.

Comparative Example 4

Sandwich panels were prepared in the same manner as Comparative Example 3 except that HRH®36, 2.5 pcf made with KEVLAR® was used as the core instead of HRH®10. The peel strength was found to be between 12 and 18 in-lb/3 in width.

Comparative Example 5

Sandwich panels were prepared in the same manner as Comparative Example 4 except that the HRH®36 core was edge coated with various coatings that did not include a polyamide adhesive. One of the materials was A-22, which is a commercially available anionic surfactant that is available from Cytec Industries, Inc. (West Paterson, N.J.). As described in US00/5575882A, a significant increase in honeycomb modulus was observed after immersing the core into a 2% by weight solution of A-22 anionic surfactant. A second edge-coating material was 23056 which is a typical phenolic resin for non-metallic core such as HRH®10 core. 23056 is available commercially from Durez Corp. (Addison, Tex.). A third material was Phenolic coating 94-917, which is a modified phenolic that is used as a coating for cans. Phenolic coating 94-917 is available commercially from Durez Corp. (Addison, Tex.). The honeycomb edges where coated with about 6.3 g/sq. ft. of each coating. All of the peel strengths for the resulting panels were below 11 in-lbs/3 in width.

Example 1

Sandwich panels are prepared in the same manner as Comparative Examples 1 and 2, except that the edges of the honeycomb are coated with an aqueous solution of NYSOL 1020 (also know as ZYTEL FE310018) polyamide adhesive (40 weight percent polyamide) so that depth "D" of the adhesive is between 0.005 inch (0.13 mm) and 0.008 inch (0.20 mm). The adhesive (coating) is applied to the honeycomb edges as follows: 1) a flat and level glass table top is cleaned with a degreasing solvent to remove all debris and contaminants; 2) A Gardner's knife is set on the tabletop and the gap setting at both ends of the knife are adjusted to provide the desired film thickness; 3) The polyamide solution is poured onto the table top parallel to the Gardner's knife and the knife is then dragged across the adhesive with equal pressure on both ends of the knife to form a thin film that is slightly larger than the area of the core; 4) the resulting film is visually inspected to insure that a uniform film of constant thickness has been formed; 5) the core is placed on top of the film and manually pressed downward with a consistent pressure to insure uniform application of the adhesive film to the core; 6) the core is then lifted from the table top and dried in an electric oven at 250° F. (121° C.) for 4 minutes; 7) the core is weighed to determine how much nylon adhesive has been retained on the core edge before and after coating; and 8) the process is repeated, if necessary to obtain the desired polyamide coating loading which in this example is between 3 and 10 grams per square foot (g/sq. ft.). The panels prepared in this example will have peel strengths on the order of 90 in-lbs/3 in width. The adhesive bond between the core edges and the skins or face sheets are sufficiently strong that the honeycomb wall, and not the core-skin bond, will structurally fail over at least a part of the honeycomb edge during the peel test.

Example 2

Sandwich panels were made in the same manner as Example 1 except that the prepreg face sheets or skins were the same as those used in COMPARATIVE EXAMPLE 3. The HRH®10 (8 pcf) core was edge coated with the NYSOL 1020 nylon adhesive solution to provide an adhesive loading of 4.3 g/sq. ft. and the depth D of the coating on the core edge was about 0.005 inch (0.13 mm). The peel strength of this panel was 91 in-lbs/3 in width with structural failure occurring in the honeycomb wall over a substantial portion of the honeycomb and not at the core-skin bond.

Example 3

Sandwich panels were made in the same manner as Example 2 except that HRH®36 (2.5 pcf) core was substituted in place of HRH® 10 core. The edges of six different cores were coated with 1.1, 2.3, 3.4, 3.8, 4.0 and 6.2 g/sq. ft. of polyamide adhesive (i.e., NYSOL 1020, 40% solids solution in water, as per Example 1). The resulting panels had peel strengths of 26, 30, 59, 71, 71 and 76 in-lbs/3 in width, respectively. During the peel tests, the face sheets separated from the core at the bond between the face sheet and the core. Based on this example, it is preferred for this particular type of sandwich panel configuration that the edge of the honeycomb be coated with at least 3.0 g/sq. ft. of polyamide adhesive.

Example 4

Sandwich panels were made in the same manner as Example 3 except that ELVAMIDE 8023R was used in place of NYSOL 1020 in the solution that was applied to the honeycomb. The solution was composed of: 64 weight percent ELEVAMDE 8023R; 16 weight percent ethanol; 10 weight percent benzyl alcohol; and 9 weight percent water. The edges of three different cores were coated with sufficient solution to provide loadings of 1.8, 2.9 and 3.7 gm/sq. ft. of nylon adhesive. The resulting panels had peel strengths of 37, 39 and 42 in-lbs/3 in width, respectively. During the peel tests, the face sheets separated from the core at the bond between the face sheet and the core. Based on this example, it is preferred for this particular type of sandwich panel configuration that the edge of the honeycomb be coated with at least 1.0 gm/sq. ft. of nylon adhesive this coating.

Example 5

Sandwich panels were made in the same manner as Example 3 except that the prepreg face sheets were made using F593 Resin which is available from Hexcel Corporation. The panels had peel strengths on the order of 63 in-lbs/3 in width when the core edges contained NYSOL 1020 polyamide coating weights of about 5.5 g/sq. ft. When the face sheets were attached to the core without the polyamide edge coating, the peel strength was only about 5 in-lbs/3 in width.

Example 6

Sandwich panels are made in the same manner as Example 3 except that a high temperature/high humidity polyamide adhesive is used in place of NYSOL 1020. The polyamide adhesive is preferably composed of ELVAMIDE 8023R in combination with epoxy and phenolic resins along with a suitable amount of a curing agent and/or catalyst for the resins (e.g. 4,4'-diaminodiphenylsulfone (4-4-DDS)) and a coupling agent, such as Z-6040 which is available from Dow-Corning (Midland, Mich.). In a typical formulation, a 25 to 30 weight percent solution of ELVAMIDE 8023R (ethanol:benzyl alcohol-1:2 by weight) is first prepared. This polyamide solution is then combined with from 15 to 25 weight percent of a novolak epoxy solution (e.g. 45 to 50 weight percent ECN 1299 epoxy in toluene/xylene) and 5 to 15 weight percent phenolic resin (e.g. 23-983 Resin which is available from Durez Corp. (Addison, Tex.). 0.5 to 2 weight percent of a curing agent (e.g. 4-4-DDS); 0.1 to 0.5 weight percent of a phenylurea catalyst (e.g. DIURON available from E.I. DuPont de Nemours & Company (Wilmington, Del.); and 0.1 to 0.5 weight percent of a coupling agent (e.g. Z-6040) are also included. Other additives, such as AGERITE D Resin (RT Vanderbilt of Norwalk, Conn.) may be added in small quantities (e.g. less than 1 weight percent).

The peel strengths of the sandwich panels made with the formulation above with 2 to 4 g/sq. ft. polyamide adhesive loading, when measured at room temperature under dry conditions, will generally be about 32 in-lbs/3 in width. The peel strengths of the same sandwich panels will generally only drop to about 25 in-lbs/3 in width when measured under wet conditions (e.g., 95% relative humidity or higher) at an elevated temperature of 71° C. As nylon appears to be more susceptible to water pick up than epoxy, with polyamide adhesives comprising pure nylon, typical readings for peel strength are 37 to 42 in-lbs/3 in width at room temperature (dry), and about 20 to 34 in-lbs/3 in width at conditions of elevated hot/wet.

Example 7

Sandwich panels were made in the same manner as Example 3 except that ELVAMIDE 8066 was used in place of NYSOL 1020 as the polyamide adhesive. The solution that was applied to the honeycomb was composed of: 16 weight percent ELVAMIDE 8066; 38 weight percent ethanol; 23 weight percent benzyl alcohol and 23 weight percent water. The edges of two different cores were coated with sufficient solution to provide edge loadings of 1.3 and 3.9 gm/sq. ft. of polyamide adhesive. The resulting panels had peel strengths of 19.5 and 56.3 in-lbs/3 in width, respectively. Panels made with cores that were coated with 4.0 gm/sq. ft. of ELVAMIDE 8066 adhesive had FWT's of about 450 psi at 93° C. and about 270 psi at 135° C.

Example 8

Sandwich panels were made in the same manner as Example 3 except that GRILAMID TR55 was used in place of NYSOL 1020 as the polyamide adhesive. The edges of two different cores were coated with 2.3 and 4.8 gm/sq. ft. of polyamide adhesive. The resulting panels had peel strengths at room temperature of 22.8 and 26.0 in-lbs/3 in width, respectively. The peel strengths of the two panels increased to 24.6 and 28.6 in-lbs/3 in width, respectively, when the tests were conducted at 71° C. under wet conditions. Three additional panels were made with edge coatings of 4.1, 5.2 and 5.8 gm/sq. ft. of GRILAMID TR55. The panels had peel strengths of 24, 34 and 39 in-lbs/3 in width, respectively, at room temperature. The peel strengths of the panel increased to 25, 38 and 50 in-lbs/3 in width, respectively, at 93° C. The FWT for these three panels at 93° C. was 767 psi, 808 psi and 891 psi, respectively. At 135° C., the FWT for the same panels decreased to 579 psi, 543 psi and 597 psi. Peel strengths of the two panels (2.3 and 4.8 gm/sq. ft.) increased to 24.6 and 28.6 in-lbs/3 in width, respectively, when the tests were conducted at 71° C. under wet conditions. As noted previously, GRILAMID TR55 is based on aromatic blocks and has a relatively high glass transition temperature (Tg) when compared to other polyamide adhesives that contain only aliphatic and cycloaliphatic blocks. Accordingly, polymer adhesives, such as GRILAMID TR55, which have relatively high Tg's, are better suited for use at elevated temperatures and/or in a wet environment.

Example 9

Aircraft Aisle Floor Panel

Aircraft aisle floor panels were made in the same manner as the panels described in Example 8. The panel cores were HRH®36 (7.0 pcf). The two face sheets were formed from prepreg composed of 1 ply of 12,000 filament (12K) intermediate modulus IM7 or IM7C type carbon fibers (HEXCEL CORP., Dublin, Calif.) which were woven to provide a 5 harness satin weave. The fibers were impregnated with resin to provide a 315 gsm prepreg which was composed of about 38 weight percent resin. The resin had the following formulation:

47 weight percent DER331 or GY2600 (reaction products of epichlorohydrin and Bis Phenol A)
9 weight percent Polyvinyl Formal (PVF)
16 weight percent Epon 1009F (bisphenol A/epichlorohydrin resin);
9 weight percent tetra bromo bis phenol A (TBBPA);
8 weight percent DER332, Diglycidal Ether of bis Phenol A
3 weight percent antimony trioxide
5 weight percent dicyanamide
3 weight percent diuron The resin was prepared as follows: MEK solvent and DER331 or GY2600 were added to a mixing vessel and stirred. PVF was added while mixing. The Mix was heated to 180° F. while stirring in a reflux process. After 3½ hours the mix was cooled to 150° F. to check dissolution, and thereafter cooled to 130° F. while continuing to stir. Epon 1009F was added and stirred until dissolved. TBBBPA, DER332, and antimony trioxide were added while stirring. Dicyanamide and Diuron were then added while stirring.

Face sheets were prepared by first forming prepreg of 315 gsm 12K IM7C 5HS fabric containing 38% of resin. The prepreg was formed as follows:

The resin solution was placed in a dip pan and the fabric was passed through the resin solution, then the MEK was driven off in a vertical tower oven. The prepreg was rolled up with an interleaf sheet of poly film and stored in a freezer until needed.

The prepreg was applied to HRH® 36 honeycomb core having ⅛ inch (0.31 cm) cells and being 0.375 inch (9.5 mm) thick in a heated flat platen press and cured for 1 hour at 130° C. with a pressure of 50 psi. After cure, the press was cooled under pressure to 40° C. and then the panels were removed. Specimens cut from the panels were subjected to peel test according to ASTM D 1781. The face sheets all had peel strengths about 37 in-lb/3 in width.

The edges of the honeycomb were coated with 45 gsm Elvamide 8066 prior to application of the face sheets to the core and curing.

These aisle floor panels had an overall thickness of 0.40±0.01 inch and weighed 0.47±0.02 lb/sq. ft. The thickness of the face sheets (skins) was 0.012±0.001 inch. The long beam bending for the panels was 331±20 lbs and the long beam deflections at 100 lbs were 0.35±0.005 inch. The shear strength of the panels was 862±25 and the drum peel strengths were 37±6 in-lbs/3" width.

Example 10

Aircraft Under Seat Floor Panel

Aircraft under seat floor panels were made in the same manner as the aircraft aisle panels described in Example 9. The panel cores were HRH®36 (5.0 pcf). The two face sheets were formed from prepreg composed of 1 ply of 12 K IM7 or IM7C type graphite fibers which were woven to provide a 5 harness satin weave. The fibers were impregnated with the same resin used in Example 9 to provide a 315 gsm prepreg which was composed of about 38 weight percent resin. The edges of the core were coated with 45 gsm Elvamid 8066 prior to application of the face sheets to the core and curing.

The under seat floor panels had an overall thickness of 0.40±0.01 inch and weighed 0.40±0.02 lb/sq. ft. The thickness of the face sheets (skins) was 0.012±0.001 inch. The long beam bending for the panels was 311±20 lbs and the long beam deflections at 100 lbs were 0.36±0.005 inch. The shear strength of the panels was 602±150 and the drum peel strengths were 57±20 in-lbs/3" width.

Example 11

Aircraft Galley Floor Panel

Aircraft galley floor panels were made in the same manner as the panels described in Example 9. The panel cores were HRH®36 (10.5 pcf). The two face sheets were formed from prepreg composed of 1 ply of 12 K IM7 or IM7C type graphite fibers which were woven to provide a 5 harness satin weave. The fibers were impregnated with the same resin used in Example 9 to provide a 400 gsm prepreg which was composed of about 38 weight percent resin. The edges of the core were coated with 45 gsm Elvamid 8066 prior to application of the face sheets to the core and curing.

The galley floor panels had an overall thickness of 0.40±0.01 inch and weighed 0.63±0.02 lb/sq. ft. The thickness of the face sheets (skins) was 0.015±0.001 inch. The long beam bending for the panels was 394±20 lbs and the long beam deflections at 100 lbs were 0.29±0.005 inch. The shear strength of the panels was 1304±50 and the drum peel strengths were 58±20 in-lbs/3" width.

Example 12

Aircraft High Load Floor Panel

Aircraft high load floor panels were made in the same manner as the panels described in Example 9. The panel cores were HRH®36 (12.5 pcf). The two face sheets were formed from prepreg composed of 2 plies of 12 K IM7 or IM7C type graphite fibers which were woven to provide a 5 harness satin weave. The fibers were impregnated with the same resin used in Example 9 to provide a 315 gsm prepreg which was composed of about 38 weight percent resin. The edges of the core were coated with 45 gsm Elvamid 8066 prior to application of the face sheets to the core and curing.

The high load floor panels had an overall thickness of 0.40±0.01 inch and weighed 0.86±0.02 lb/sq. ft. The thickness of the face sheets (skins) was 0.024±0.002 inch. The long beam bending for the panels was 699±20 lbs and the long beam deflections at 100 lbs were 0.17±0.005 inch. The shear strength of the panels was 1600±50 and the drum peel strengths were 60±10 in-lbs/3" width.

Example 13

Panels were made in accordance with Example 8 except that GRILAMID TR90 was substituted for GRILAMID TR55. The peel strength for panels having core edges coated with 5.2 gm/sq. ft. GRILAMID TR90 was about 23 in-lbs/3 in width at room temperature and 27 in-lbs/3 in width at 93° C. The FWT at 93° C. was 639 psi. At 135° C. the FWT was 519 psi.

Example 14

Panels were made in accordance with Example 8 except that mixtures of ELVAMIDE 8066 and GRILAMID TR55 were substituted for GRILAMID TR55. Three different mixtures of the two polyamides (Type A, Type B and Type C) were prepared. In Type A, the polyamide mixture included 65 weight percent ELVAMIDE 8066 and 35 weight percent GRILAMID TR55. In Type B, the polyamide mixture included 50 weight percent of each polyamide adhesive. In Type C, the polyamide mixture included 25 weight percent ELVAMIDE 8066 and 75 weight percent GRILAMID TR55. Solutions containing the Type A and Type B polyamide mixtures were coated onto the honeycomb edge to provide adhesive weights of 4.0 gms/sq. ft. The peel strengths were 34 and 42 in-lbs/3 in width, respectively, at room temperature. The FWT at 93° C. was 459 psi for the Type A edge coating and 628 psi for Type B. At 135° C., the FWT dropped to 292 psi for Type A and 344 psi for Type B. The Type B polyamide adhesive combination was also coated at a rate of 3.9 gms/sq. ft. As expected, the peel strengths were lower than the panels coated at a 4.0 gms/sq. ft. rate. However, the FWT at 93° C. increased to about 660 psi. At 135° C., the FWT for the slightly lower loaded panel also increased to 391 psi.

The Type C combination was edge-coated onto the cores at a rate of 4.3 gms/sq. ft. The peel strengths were about 30 in-lbs/3 in width at both room temperature and 93° C. The FWT at 93° C. was 659 psi. At 135° C., the FWT dropped to 370 psi.

Example 15

Panels were made in the same manner as Example 14, except that a small amount of ECN 1299 epoxy was added to the ELVAMIDE 8066/GRILAMID TR55 polyamide adhesive. Three different combinations of adhesive solutions (Type D, Type E and Type F) were prepared. The Type D adhesive solution contained 6.9 weight percent ELVAMIDE 8066, 6.9 weight percent GRILAMID TR55, 1.2 weight percent ECN 1299, 83.1 weight percent benzyl alcohol and 1.8 weight percent acetone. The Type E adhesive solution contained 2.9 weight percent ELVAMIDE 8066, 8.2 weight percent GRILAMID TR55, 1.0 weight percent ECN 1299, 86.4 weight percent benzyl alcohol and 1.5 weight percent acetone. The Type F adhesive contained 2.9 weight percent ELVAMIDE 8066, 8.7 weight percent GRILAMID TR55, 0.61 weight percent ECN 1299, 86.9 weight percent benzyl alcohol and 0.9 weight percent acetone. The peel strengths for all three of the adhesive types ranged from 28 to 31 in-lbs/3 in width at both room temperature and 93° C. for coating weights of about 4.2 g/sq. ft. The FWT for the Type D adhesive was 527 psi at 93° C. and 365 psi at 135° C. The FWT for the Type E adhesive was 700 psi at 93° C. and decreased to 456 psi at 135° C. The FWT for the Type F adhesive was 696 psi at 93° C. and 442 psi at 135° C.

Comparative Example 6

A sandwich panel was made in the same manner as Comparative Example 4 except that the face sheet prepreg was made using an epoxy resin matrix that is available from Hexcel Corporation under the tradename F155. The honeycomb was not edge coated and a separate structural adhesive was not applied to the prepreg. The peel strength for the panel was 10 in-lbs/3 in width at room temperature. The FWT was 579 psi at room temperature and 501 psi at 71° C.

Example 16

Sandwich panels were made in the same manner as Comparative Example 6 except that the HRH-36 core was edge coated with a rubber-modified epoxy adhesive in accordance with the present invention. The adhesives were prepared as follows. A rubber solution (Solution 1) was prepared by mixing 85 parts by weight MEK with 15 parts by weight NIPOL 1472. The mixture was kept at room temperature for 3 to 4 hours until the NIPOL 1472 rubber particles had completely dissolved. A second solution was prepared by mixing 302 grams of Solution 1 with 172 grams bisphenol A, 3 grams of a tertiary amine catalyst, 136 grams of DER 331 epoxy resin, 317 grams of GY 282 epoxy resin and 68 grams of HYCAR 1300x13 liquid rubber. All of these materials were mixed together and heated to 140° C. to 150° C. for 90 minutes to form Solution 2.

45 grams of Solution 2 was then mixed with 65 grams MEK, 32 grams of GY2600 epoxy, 32 grams of pulverized dicyandiamide and 15 grams of a urea catalyst to provide a Solution 3. A first adhesive was prepared by mixing 300 grams of Solution 3 with 150 grams of a rubber solution that contained 20 weight percent NIPOL 1472 rubber particles dissolved in MEK. The total rubber content for this rubber-modified epoxy adhesive (RBE 1) was 16.6 weight percent. A second adhesive was prepared by mixing 265 grams of Solution 3 with 185 grams of the rubber solution that contained 20 weight percent NIPOL 1472. The total rubber content for this adhesive (RBE 2) was 20.4 weight percent.

The HRH-36 honeycomb was coated with 5.2 gms/sq. ft. of RBE 1 or 5.4 gms/sq. ft. of RBE 2 prior to bonding of the face sheet to the core. At room temperature, the peel strengths for the panels were 41 and 52 in-lbs/3 in width for RBE 1 edge coated cores and RBE 2 edge coated cores, respectively. Corresponding peel strengths at 71° C. were 44 and 50 in-lbs/3 in width, respectively. The FWT for RBE 1 coated cores at room temperature and 71° C. were 708 psi (due to core failure) and 530 psi, respectively. The FWT for RBE 2 coated cores at room temperature and 71° C. were 693 psi (due to core failure) and 455 psi, respectively.

Example 17

A sandwich panel was made in the same manner as Example 12 except that the HRH-36 core was coated with 4.0 gms/sq. ft. of the polyamide edge coating of Example 4, except that ELVAMIDE 8066 was substituted for ELVAMIDE 8023R. The peel strength was 47 in-lbs/3 in width at room temperature. The FWT at room temperature was 665 psi (due to core failure) and the FWT at 71° C. dropped to 396.

Example 18

Aircraft Interior Panel

Sandwich panels were made for use in the interior of a large commercial aircraft. The aircraft interior panels were made in the same basic manner as the panels described in the preceding examples. The honeycomb was HexWeb®HRH-36 that had ⅛-inch cells. The honeycomb had thicknesses ranging from 0.375 inch to 0.5 inch. The density for all of the honeycomb cores was 2.5 pcf. The honeycomb dip resin was a phenolic resin.

The two face sheets where made using CYCOM®2290 which, as previously mentioned, is a standard 7781 phenolic/fiberglass prepreg. ELVAMIDE 8066 was used as the edge coating in the same manner as Example 7. Three different panels were made with the amount of adhesive being 0.5, 1.5 and 2.0 gsm for each edge of the honeycomb (1.0, 3.0 and 4.0 gsm for total panel).

The panels were all about 48 inch wide and from 45 to 50 inches long. The 0.375-inch thick panels weighed from about 4.3 to 4.5 lbs (areal weights of from 0.284 to 0.294 psf). The 0.5-inch thick panels weighed from 4.8 to 5.2 lbs (areal weight of from 0.313 to 0.318 psf). The peel strengths ranged from 10 to 30 in-lbs/3 in width at room temperature as the amount of edge adhesive increased from 0.5 to 2.0 gsm. Typically, phenolic prepreg and plain uncoated HRH36 honeycomb have peel strengths of around 5 inlb/3 in.

Example 19

Aircraft Interior Panel Comparison

Aircraft interior panels were made in the same manner as Example 18, except that the honeycomb was changed to a aramid paper/phenolic resin core similar to HexWeb®HRH36, except that the density of the core was 3.0 pcf and it was 0.39 inch thick. The phenolic dip resin was the same. The cell size was also ⅛-inch. The prepreg that was used for the face sheets was J.D. Lincoln L-591PG-7781 having 38 weight percent resin content. Panels were made using no edge coating and using 4.0 gsm ELVAMIDE®8066 (2.0 gsm per edge) in the same manner as Example 18. The panel with no edge coating had an areal weight of 0.297 pounds per square foot (psf). The panel with edge coating (4.0 gsm) had an areal weight of 0.314 psf.

With no edge coating, the peel strength of the panel at room temperature was 3 in-lbs/3 in width. With edge coating, the peel strength was 13 in-lbs/3 in width. The Long Beam Load was 95 lbs without edge coating and 151 lbs when the edge coating was used. Long Beam Skin Stress was 19800 psi without edge coating and 31400 psi when edge coating was used.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-preferred embodiments, but is only limited by the following claims.

What is claimed is:

1. A method for making an aircraft interior or floor panel comprising the steps of:
    providing a first uncured face sheet comprising an interior surface and an exterior surface, said first uncured face sheet comprising at least one fiber layer and an uncured thermosetting resin matrix;
    providing a second face sheet comprising an interior surface and an exterior surface;
    providing a honeycomb having walls that define a plurality of honeycomb cells wherein said walls have a first edge for bonding to the interior surface of said first uncured face sheet and a second edge for bonding to the interior surface of said second face sheet;
    applying an adhesive only to said first edge to form an edge-coated honeycomb wherein said adhesive comprises a rubber-modified thermosetting resin; and
    bonding said uncured first face sheets and said second face sheet to said edge-coated honeycomb, said bonding comprising the step of curing said uncured thermosetting resin matrix.

2. A method for making an aircraft interior panel according to claim 1 wherein said aircraft interior panel is selected from the group consisting of overhead storage bin panels, ceiling panels, bulkhead panels, lavatory panels, wardrobe panels, galley panels, partition panels and side wall panels.

3. A method for making an aircraft interior panel according to claim 2 wherein the density of said honeycomb is from 1.5 pound per cubic foot to 5.0 pounds per cubic foot.

4. A method for making an aircraft interior panel according to claim 2 wherein said rubber-modified thermosetting resin comprises a thermosetting resin selected from the group consisting of epoxy resin, phenolic resin, cyanate esters and bismaleimides.

5. A method for making an aircraft interior panel according to claim 2 wherein the amount of said adhesive that is present on said first edge of said edge-coated honeycomb ranges from 0.5 to 2.0 grams per square meter.

6. A method for making an aircraft interior or floor panel according to claim 1 wherein said second face sheet is an uncured face sheet that comprises at least one fiber layer and an uncured thermosetting resin matrix and wherein said method includes the steps of:
    applying an adhesive only to said second edge of said honeycomb wherein said adhesive comprises a rubber-modified thermosetting resin; and
    bonding said uncured second face sheet to said edge-coated honeycomb, said bonding comprising the step of curing said uncured thermosetting resin matrix.

7. A method for making an aircraft interior panel according to claim 6 wherein said aircraft interior panel is selected from the group consisting of overhead storage bin panels, ceiling panels, bulkhead panels, lavatory panels, wardrobe panels, galley panels, partition panels and side wall panels.

8. A method for making an aircraft interior panel according to claim 7 wherein the density of said honeycomb is from 1.5 pound per cubic foot to 5.0 pounds per cubic foot.

9. A method for making an aircraft interior panel according to claim 7 wherein said rubber-modified thermosetting resin comprises a thermosetting resin selected from the group consisting of epoxy resin, phenolic resin, cyanate esters and bismaleimides.

10. A method for making an aircraft interior panel according to claim 7 wherein the amount of said adhesive that is present on said second edge of said edge-coated honeycomb ranges from 0.5 to 2.0 grams per square meters.

11. A method for making an aircraft floor panel according to claim 1 wherein said aircraft floor panel is selected from the group consisting of aisle floor panels, under seat floor panels, galley floor panels and high load floor panels.

12. A method for making an aircraft floor panel according to claim 11 wherein the density of said honeycomb is from 5 pounds per cubic foot to 15 pounds per cubic foot.

13. A method for making an aircraft floor panel according to claim 11 wherein said rubber-modified thermosetting resin comprises a thermosetting resin selected from the group consisting of epoxy resin, phenolic resin, cyanate esters and bismaleimides.

14. A method for making an aircraft floor panel according to claim 11 wherein the amount of said adhesive that is present on said first edge of said edge-coated honeycomb ranges from 0.5 to 2.0 grams per square meter.

15. A method for making an aircraft floor panel according to claim 6 wherein said aircraft floor panel is selected from the group consisting of aisle floor panels, under seat floor panels, galley floor panels and high load floor panels.

16. A method for making an aircraft floor panel according to claim 15 wherein the density of said honeycomb is from 5 pounds per cubic foot to 15 pounds per cubic foot.

17. A method for making an aircraft floor panel according to claim 15 wherein said rubber-modified thermosetting resin comprises a thermosetting resin selected from the group consisting of epoxy resin, phenolic resin, cyanate esters and bismaleimides.

18. A method for making an aircraft floor panel according to claim 15 wherein the amount of said adhesive that is present on said second edge of said edge-coated honeycomb ranges from 0.5 to 2.0 grams per square meter.

19. A method for making an aircraft interior panel according to claim 1 wherein said rubber-modified thermosetting resin comprises acrylonitrile-butadiene copolymer rubber.

20. A method for making an aircraft floor panel according to claim 6 wherein said rubber-modified thermosetting resin comprises acrylonitrile-butadiene copolymer rubber.

* * * * *